(12) United States Patent
Ruppert

(10) Patent No.: US 11,505,076 B2
(45) Date of Patent: Nov. 22, 2022

(54) SYSTEM FOR EXCHANGING ELECTRICAL ENERGY

(71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 314 days.

(21) Appl. No.: 16/830,791

(22) Filed: Mar. 26, 2020

(65) Prior Publication Data

US 2020/0317073 A1    Oct. 8, 2020

(30) Foreign Application Priority Data

Apr. 8, 2019  (DE) ...................... 10 2019 204 957.5

(51) Int. Cl.
*B60L 53/302* (2019.01)
*B60L 53/10* (2019.01)
(Continued)

(52) U.S. Cl.
CPC ............ *B60L 53/302* (2019.02); *B60L 53/10* (2019.02); *B60L 58/26* (2019.02);
(Continued)

(58) Field of Classification Search
CPC ........ B60L 53/302; B60L 53/10; B60L 58/26; B60L 53/14; B60L 53/30; B60L 55/00;
(Continued)

(56) References Cited

U.S. PATENT DOCUMENTS 9,260,025 B1 *   2/2016  McGrath ................. F24D 15/00
2006/0219448 A1 * 10/2006  Grieve .................... B60L 58/40
                                                                320/109
(Continued)

FOREIGN PATENT DOCUMENTS

DE    10 2010 011 704 A1    9/2011
DE    10 2012 202 465 A1    8/2012
(Continued)

OTHER PUBLICATIONS

European Search Report dated May 20, 2020, in connection with corresponding EP Application No. 20163288.2 (10 pgs., including machine-generated English translation).
(Continued)

*Primary Examiner* — Lincoln D Donovan
*Assistant Examiner* — Alex W Lam
(74) *Attorney, Agent, or Firm* — Maier & Maier, PLLC

(57) ABSTRACT

A system for exchanging electrical energy between an electrical energy source and an electrical energy store of a vehicle, wherein the system includes an electrical connection, at least one electronic component, and a cooling device having a heat transfer medium, wherein, when the electrical energy store of the vehicle is connected to the electrical connection and electrical energy is exchanged between the energy source and the electrical energy store via the at least one electronic component, the heat transfer medium of the cooling device is designed to provide heat, which arises during the exchange of electrical energy in the system, to a consumer of the heat, which is coupled to the system and is arranged in a building.

19 Claims, 2 Drawing Sheets

(51) Int. Cl.
  *B60L 58/26* (2019.01)
  *H02J 7/02* (2016.01)
  *F24D 17/00* (2022.01)
  *H02J 7/34* (2006.01)

(52) U.S. Cl.
  CPC ............ *F24D 17/0005* (2013.01); *H02J 7/02* (2013.01); *H02J 7/345* (2013.01); *F24D 2200/29* (2013.01)

(58) Field of Classification Search
  CPC ........ B60L 3/0046; B60L 53/60; B60L 53/66; B60L 53/18; B60L 53/11; F24D 17/0005; F24D 2200/29; H02J 7/02; H02J 7/345; H02J 9/002; H02J 7/0029; H02J 2310/64; H02J 2310/48; Y02T 10/70; Y02T 10/7072; Y02T 90/12; Y02T 90/14
  See application file for complete search history.

(56) References Cited

U.S. PATENT DOCUMENTS

| | | | |
|---|---|---|---|
| 2012/0263988 A1* | 10/2012 | Obasih | B60L 50/66 429/98 |
| 2015/0217654 A1* | 8/2015 | Woo | B60L 53/18 320/109 |
| 2017/0174086 A1* | 6/2017 | van de Loo | B60L 53/18 |

FOREIGN PATENT DOCUMENTS

| | | |
|---|---|---|
| DE | 10 2011 001 633 A1 | 10/2012 |
| DE | 10 2016 004 851 A1 | 12/2016 |
| DE | 10 2017 201 541 A1 | 8/2018 |
| DE | 10 2018 005 120 A1 | 2/2019 |
| DE | 10 2017 217 436 A1 | 4/2019 |
| EP | 2 779 349 A1 | 9/2014 |
| JP | 2013-134033 A | 7/2013 |
| WO | 2011/145939 A2 | 11/2011 |

OTHER PUBLICATIONS

Examination Report dated Mar. 3, 2020 in corresponding German application No. 10 2019 204 957.5 ; 16 pages including Machine-generated English-language translation.

* cited by examiner

SYSTEM FOR EXCHANGING ELECTRICAL ENERGY

FIELD

The disclosure relates to a system for exchanging electrical energy and to a method for exchanging electrical energy.

BACKGROUND

In order to supply an electric vehicle with electrical energy, its battery can be connected to a charging station provided for this purpose.

DE 10 2017 201 541 A1 describes a motor vehicle having at least one rechargeable battery, a system consisting of a motor vehicle and a charging station, and a method for controlling the temperature of a rechargeable battery of a motor vehicle.

A charging device for a motor vehicle is known from document DE 10 2011 001 633 A1.

Document DE 10 2016 004 851 A1 discloses a motor vehicle having a means for transferring heat produced during the charging process of a traction battery to a hot water system external to the vehicle.

Against this background, one problem addressed is to make a charging process efficient for charging a battery of a vehicle.

SUMMARY

This problem is solved by a system and a method having the features of the independent claims. Embodiments of the system and of the method arise from the dependent claims.

The system according to the invention is designed to exchange electrical energy between an electrical energy source and an electrical energy store, for example a battery or an accumulator, of a vehicle, and comprises an electrical connection which is connected to the electrical energy source, at least one electronic component, and a cooling device having a heat transfer medium. If the electrical energy store of the vehicle is connected to the electrical connection and electrical energy is exchanged via the at least one electronic component between the energy source and the electrical energy store, the heat transfer medium of the cooling device is designed to provide heat or waste heat, produced when electrical energy is exchanged in the system, to a consumer of the heat which is coupled to the system and arranged outside the vehicle in a building.

In an embodiment for the bidirectional exchange of electrical energy, the system is designed to transmit electrical energy from the electrical energy source to the electrical energy store and, in the process, to charge the electrical energy store on the one hand, but also to transfer electrical energy from the electrical energy store to the electrical energy source and thereby to discharge the electrical energy store on the other hand.

Generally, when electrical energy is exchanged via the electrical connection and the at least one component, the electrical energy store is connected to the electrical energy source, which can also be arranged in the building and/or connected to the building.

In the system, the electrical connection is designed as a direct current connection or DC voltage connection for exchanging electrical energy between the electrical energy source and the electrical energy store of the vehicle by a direct current or a DC voltage.

The system has a housing and/or a wall box as a charging station, in which at least one cooling channel, for example cooling channels or a corresponding cooling tubing, of the cooling device, designed for transporting and/or conveying the heat transfer medium, is or are at least partially arranged, wherein the cooling channels of the cooling device are designed to transport the heat transfer medium. In addition, the at least one electronic component, heated when electrical energy is exchanged, is arranged in the housing. Furthermore, the at least one electronic component is designed, for example, as a power semiconductor switch and bears directly against the cooling device, i.e. usually directly against the cooling channels. The housing also has a rear wall, wherein the cooling device is at least partially, optionally completely, integrated in the rear wall, wherein the cooling channels are arranged at least partially in the rear wall, and/or wherein the at least one electronic component is thermally insulated from the rear wall by means of an insulating material, for example gap pad. Another possibility is that the housing is, should be, or can be arranged on a building wall of the building, wherein in particular the rear wall is, should be, or can be arranged directly on the housing wall. It is conceivable for the cooling channels to at least partially enclose electronic components and/or be arranged between components. In this case, for example, at least one cooling channel can be arranged between the rear wall and at least one electronic component. Alternatively or additionally, at least one electronic component can be arranged between at least one cooling channel and the rear wall. The rear wall may be coated with the insulating material.

Furthermore, depending on the definition, the system can have a heat transfer means which thermally couples and/or connects the cooling device and the consumer, arranged in the building, of the heat from the at least one electronic component. The heat transfer means can also have cooling channels, by means of which the heat transfer medium heated during the exchange of electrical energy is transported from the cooling device to the consumer. Cooled heat transfer medium can also be transported from the consumer via the heat transfer means back to the cooling device and thus also to the at least one electronic component to be cooled. Water can be used, for example, as the heat transfer medium. The consumer of the heat can be designed as a sanitary heat circuit or heating circuit of the building and can likewise convey the heat transfer medium, for example water, and/or provide it to a user. Depending on the definition, the heat transfer means can also be designed as part of the heat circuit of the building.

The system can comprise a power electronics unit, which has the at least one electronic component, for example a power semiconductor, and is likewise arranged in the housing, wherein cooling channels for the heat transfer medium are directly connected to the power electronics unit, wherein the heat transfer medium is designed to provide the heat of the power electronics unit to the consumer.

In addition to the rear wall, the housing for the system can also have a front wall, in which at least the electrical connection for the electrical energy store of the vehicle is arranged, which can be configured or described, for example, as a charging socket and/or as a plug socket, wherein the electrical connection is connected in turn to the at least one electronic component in the housing. The electrical connection for the electrical energy store can also comprise a cable, at the end of which the charging socket and/or the plug socket is/are arranged. In this case, it is possible for the front wall to have an opening for the cable through which the cable is guided and which can connect the at least one electronic component in the housing to the electrical energy store of the vehicle.

The method according to the invention is provided for exchanging electrical energy between an electrical energy source and an electrical energy store, for example an accumulator or a battery, of a vehicle having a system, for example an embodiment of the system disclosed above, which comprises an electrical connection, at least one electronic component, and a cooling device having a heat transfer medium. If the electrical energy store of the vehicle is connected to the electrical connection and electrical energy is exchanged between the energy source and the electrical energy store via the at least one electronic component, heat generated in the system during electrical energy exchange is provided by the heat transfer medium of the cooling device to a consumer of the heat, which is coupled to the system and is arranged outside the vehicle in a building.

In one embodiment of the method, the exchanging or exchange of electrical energy between the electrical energy source and the electrical energy store can be smartly controlled, for example controlled in an open-loop and/or closed-loop manner, by an energy exchange function, for example a charging function or a discharging function, according to a heat demand of the consumer.

In the method, the cooling device is connected to a hot water system of the building as a consumer of the heat, wherein the heat or waste heat of the cooling device is transferred by the heat transfer medium, for example water, to the hot water system. In this case, it is possible for the cooling device to be connected via a heat transfer means to the consumer of the heat, for example in the form of a hot water system, wherein the heat transfer medium is transported and/or exchanged between the cooling device and the consumer via or through the heat transfer means. The cooling device, the heat transfer means and the consumer of the heat can form, for example, a closed circuit for the heat transfer medium. The consumer for the heat can be coupled to the system via the heat transfer means.

The electrical energy store of the vehicle may be referred to as a traction battery and may be designed to provide electrical energy to an electric engine of the vehicle to drive or propel the vehicle.

It is possible for an embodiment of the disclosed system to be realized by means of an embodiment of the disclosed method and/or for an embodiment of the proposed method to be implemented by means of an embodiment of the disclosed system.

Using the system and/or the method, a "heat exchanger interface for a DC wall box for electric car charging" can be realized. In this case, the cooling device can be designed as a heat exchange interface between the at least one electrical component, heated when electrical energy is exchanged, and the consumer of the generated heat when the electric vehicle or an electrically driven vehicle is charged or discharged. The electrical connection can be designed and/or described as a current interface, for example a direct current interface, for the electrical energy to be exchanged.

The system comprises the cooling device, which has a cooling tubing, in the form of cooling channels, embedded in the rear wall of the housing or the DC wall box. A thermal connection of the cooling channels or cooling tubing or cooling piping is arranged on a side or side wall of the housing or of the DC wall box and is guided out of the housing through the side wall to the outside, wherein the cooling channels can be connected directly, for example, via the thermal connection to the consumer of the heat, or indirectly via a heat transfer means. The DC wall box can thus be coupled by integration into the heat circuit and/or by the thermal connection to the sanitary heat circuit of the building, for example a house, and can be used as an additional heat exchanger.

A power loss of approximately 1.32 kW which arises during charging or a charging process of the electrical energy store can thus be used to heat fresh water for the building, for example. A condition for this is that at least one component of a power electronics unit, as the at least one electronic component, in an interior of the housing or the DC wall box is cooled by the cooling device via the rear wall and that the heat can be transferred to the consumer to this end. Generally, the system comprises a plurality of components arranged in the housing, all of which can be cooled via the rear wall. In this case, for example, power semiconductors as electronic components can be arranged directly on the rear wall. It is possible for insulating material, for example at least one gap pad, to be disposed between the components and the rear wall.

In one embodiment, the waste heat of the housing or the wall box, usually the waste heat of electronic components disposed therein, is used to heat the consumer. The waste heat can be used to heat process water, for example, as a consumer in the building, such as a house. Alternatively or additionally, the waste heat can also be used to heat water of a heating circuit, for example an underfloor heating system, a heater or a radiator, as a consumer in the building. Depending on the definition, by means of the system, i.e. by means of at least one component of the system, a heat exchanger is provided, which is designed to make use of a power loss arising during charging and/or discharging of the electrical energy store of the vehicle. The heat or waste heat arises in this case from the power loss. The power loss can thus be utilized as waste heat for the consumer in the building.

In an embodiment, the system can be used to realize an interface or a corresponding device for a bidirectional charging station, in particular a direct-current charging station, or the DC wall box for personal home use. The system or the device is used to make the power loss, in the form of heat arising in the bidirectional DC wall box or in the housing, available for a household, as a consumer, in the building. In this case, the charging or discharging, or charging process or discharging process, of the energy store of the vehicle can be controlled as a function of a heat demand of the consumer, for example the household, wherein the power loss arising during the exchange of electrical energy is reduced and optionally avoided. In respect of the bidirectionality of the electrical energy exchange, including both the charging and the discharging of the energy store, the system and the method are suitable for utilizing the power loss arising in the housing or the DC wall box since the disclosed system has at least double the operating time of a conventional charging system. In this case, the electrical connection differs, for example, from an inductive base plate, which can be used for the contactless charging of a battery, since the electrical connection provided as a component of the method is designed to connect the system to the energy store via a wire-based and/or cable-based line or connection. Owing to the bidirectionality of the electrical energy exchange provided, wherein bidirectional energy conversion can be carried out, the number of operating hours as well as the power loss can be double as a result. By using, inter alia, the smart charging function and/or discharging function, the power loss or the corresponding waste heat can be transferred to a hot water circuit as a consumer of the building, for example the house, since the at least one electronic component, which heats up when electrical energy is exchanged, is connected and/or coupled to said consumer for heat. In addition, the charging or charging process can be started and/or controlled by means of the smart charging function according to a hot water demand of the house.

By means of the method and the system, the charging or discharging process of the electrical energy store can thus be controlled according to the heat demand, for example the hot water demand, of the household of the building. The housing or the DC wall box of the system can also be used privately, wherein the housing can be arranged either on an outer wall or on an inner wall, for example in a garage, of the building. In particular, the bidirectionality of the exchange of electrical energy between the energy source and the energy store can have a considerable effect on the utilization of heat, for example heat loss, since the system for the bidirectional exchange of electrical energy provides at least twice as many operating hours as a system for the unidirectional exchange of electrical energy, wherein only charging the electrical energy store is possible in the unidirectional exchange of electrical energy, but discharging the electrical energy store is not possible.

Naturally, the features mentioned above and those still to be explained below can be used not only in the specified combination in each case but also in other combinations or alone, without departing from the scope of the present invention.

BRIEF DESCRIPTION OF THE DRAWINGS

The disclosure is shown schematically in the drawings on the basis of embodiments and is described schematically and in detail with reference to the drawings.

DETAILED DESCRIPTION

The figures are described in a coherent and overlapping manner; the same reference signs are assigned to identical components.

Figure 1:
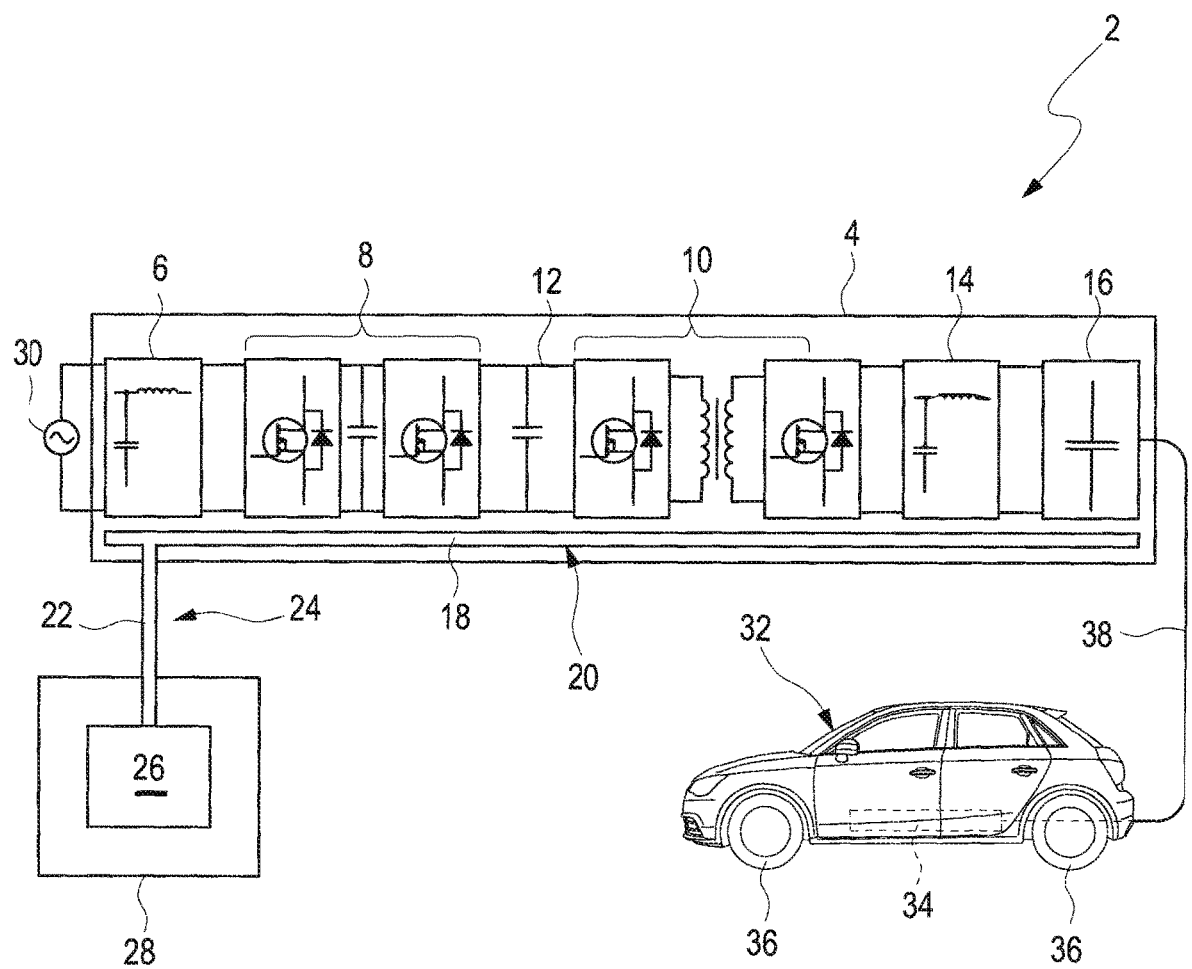
FIG. 1 shows a schematic representation of a first embodiment of the system according to the disclosure when a first embodiment of the method according to the invention is carried out.

The first embodiment of the system 2 according to the invention shown schematically in FIG. 1 comprises a housing 4, which can also be designed and/or described as a wall box. A plurality of electronic components is arranged in the housing 4, specifically an input filter 6, a first converter 8 and a second converter 10, between which a capacitor 12 is arranged or connected, an output filter 14 and a connection 16. The first converter 8 is designed here as a bidirectional alternating current/direct current stage or AC/DC stage (PFC). The second converter 8 is designed here as a bidirectional direct current/direct current stage or DC/DC stage.

As further components of the system 2, FIG. 1 shows a first cooling channel 18 of a cooling device 20 of the system 2, which is likewise arranged in the housing 4. The system 2 also comprises a second cooling channel 22 of a heat transfer means 24, which is designed to connect or couple the cooling device 20 within the housing 4 to a consumer 26 for heat or waste heat, said consumer being arranged in a building 28, for example in a house. FIG. 1 shows an electrical energy source 30, which is configured here as an alternating current grid (AC grid). FIG. 1 shows a vehicle 32 which can be electrically driven and, for this purpose, has an electrical energy store 34, which is designed and/or can be described, for example, as a battery. To move the vehicle 32, electrical energy stored in the energy store 34 is transmitted to an electric engine of the vehicle 32, which in turn is configured to convert the electrical energy into mechanical energy and thereby set wheels 36 of the vehicle 32 in motion.

In order to operate the vehicle 32, electrical energy is exchanged bidirectionally between the electrical energy source 30 and the electrical energy store 34 of the vehicle 32, inter alia, wherein it is possible to both charge and discharge the energy store 34. Both for charging and for discharging the energy store 34, the latter is connected in this case via an electrical connection or line 38 to the connection 16 of the housing 4 and is thus connected to the electrical energy source 30 via said electronic components. To charge the energy store 34, electrical energy from the energy source 30, which is initially present as an alternating current or AC voltage, is converted into direct current or a DC voltage via the components in the housing 4 and made available to the energy store 34 via the line 38. When the energy store 34 is discharged, electrical energy to be discharged, which is initially present as direct current or DC voltage, is converted by the electronic components in the housing 4 into alternating current or an AC voltage, and provided to the electrical energy source 30.

In the case of such a bidirectional exchange of electrical energy between the energy source 30 and the energy store 34, heat or waste heat arises here as a result of operation of the electronic components. Said heat is transferred to a liquid heat transfer medium, in this case water, within the first cooling channel 18 of the cooling device, wherein the heat transfer medium is thus heated. This now heated heat transfer medium is further transmitted through the second cooling channel 22 of the heat transfer means to the consumer 26, in this case a hot water supply and/or heating system, of the building 28.

Figure 2:
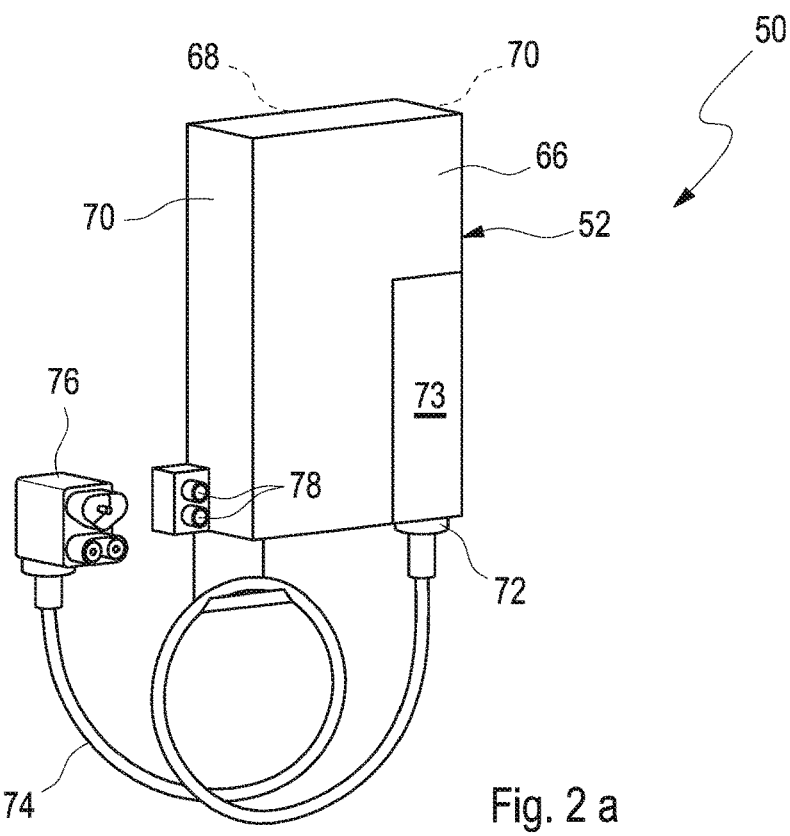
FIG. 2a shows a schematic representation of a second embodiment of the system according to the disclosure when a second embodiment of the method according to the invention is carried out.
FIG. 2b shows another schematic representation of a second embodiment of the system according to the disclosure when a second embodiment of the method according to the invention is carried out.
FIG. 2c shows another schematic representation of a second embodiment of the system according to the disclosure when a second embodiment of the method according to the invention is carried out.
Figure 2:
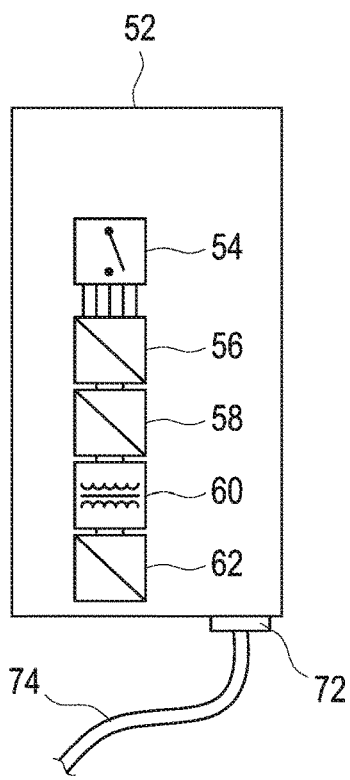
Figure 2:
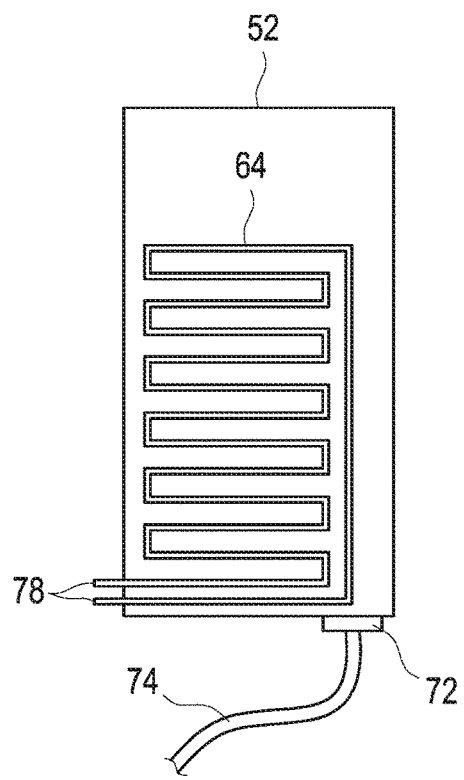

FIG. 2a shows the second embodiment of the system 50 according to the invention from the outside, said system 50 here having a housing 52, which can also be described as what is known as a wall box. FIG. 2b shows, in schematic representation, electrical components in the housing 52 (here a switch 54), a first converter 56 (here an AC/DC converter), a second converter 58 (here a DC/AC converter), a transformer 60, and a third converter 62, which is designed here as an AC/DC converter. As further schematically shown in FIG. 2c, a coolant channel 64, which is a meandering coolant channel in this case, is also arranged in the housing 52 and is designed as part of a cooling device of the system 50. Although the electronic components and the cooling channel are illustrated here schematically in two separate FIGS. 2b and 2c for the sake of clarity, the electronic components bear directly against the cooling channel 64 within the housing 52 in the embodiment of the system 50 disclosed here.

As can be seen from FIG. 2a, the housing 52 of the system 50, which is largely cuboid within conventional manufacturing tolerances, has a front wall 66 and a rear wall 68, which is covered here by the housing 52. The front wall 66 and the rear wall 68 are connected here to one another via four side walls 70 of the housing 52. An input unit 73 and an electrical connection 72 are arranged on the front wall 66 of the housing 52, to which electrical connection a cable is connected here as an electrical line 74, at the end of which a charging socket 76 is arranged. In addition, a side wall 70 of the housing 52 also has a thermal connection 78 by which the cooling channel 64 is connected within the housing 52 via a heat transfer means (not shown in detail) to a consumer for heat or waste heat, which is arranged in a building, for example in a house. In this case, it is possible to arrange the housing 52 on a wall of the building, the rear wall 68 of the housing 52 being arranged directly on the wall of the building and the front wall 66 facing away from the wall of the building.

In the second embodiment of the method according to the invention, the electronic components within the housing 52 are connected on the one hand to an electrical energy source (not shown in detail), for example a power grid. On the other hand, the electronic components are connected via the connection 72 and the line 74 to an electrical energy store of a vehicle (not shown in detail). In the embodiment of the method, it is possible to exchange electrical energy bidirectionally between the electrical energy store of the vehicle and the electrical energy source via the electronic components and thus both to charge the electrical energy store with electrical energy from the electrical energy source and to discharge the electrical energy store, thereby transmitting electrical energy from the electrical energy store to the electrical energy source via the electronic components in the housing 52. In this case, both during charging and during discharging, heat or waste heat is generated as a result of operation of the electronic components, which heat is absorbed by a heat transfer medium in the cooling channel 64, is stored in the heat transfer medium and is provided to the consumer by the heat transfer medium when the latter flows from the housing 52 to said consumer.

An electric vehicle (battery-operated electric vehicle) known from the prior art may have a combo charging socket which permits direct current or DC charging at 480 V and 150 kW but also alternating current or AC charging at 230 V or 400 V and a maximum 220 kW. Many users of such electric vehicles charge their electric vehicles at home using an AC infrastructure. In this case, an onboard charger or a charging unit arranged in the electric vehicle converts an AC voltage provided into a DC voltage for a traction battery of the electric vehicle, wherein a maximum AC charging power of 22 kW is possible in the case of a three-phase current of 32 A.

However, by means of the housing 4, 52, shown on the basis of the embodiments of the system 2, 50, and the electronic components disposed therein, it is possible for a customer to also charge an energy store 34 of his/her vehicle 32 directly using direct current at home and thus in a building. In the housing 4, 52, the electronic components form a power electronics unit and a control electronics unit, which are designed to convert the AC voltage of the electrical energy source 30, for example of a grid infrastructure, into the DC voltage. Since the electronic components within the housing 4, 52 are designed and/or constructed bidirectionally in the present case, it is also possible to discharge the electrical energy store 34 and to feed electrical energy provided in the process into the electrical energy source 30.

In this case, a charging power of the electronic components arranged in the housing 4, 52 is at most 22 kW, wherein a connected load can also be at most 22 kW. In the prior art, such an arrangement is cooled exclusively by convection and/or by means of fans, which blow air through the power electronics unit and thereby cool the latter.

The disclosed embodiments of the system 2, 50 and of the method, with respect to the prior art, have the result that a power loss arising during the exchange of electrical energy, i.e. during charging or discharging, for example when converting the electrical energy from direct current to alternating current and vice versa, is converted into heat, which is transmitted directly into the heat transfer medium of the cooling device 20, for example of the cooling channels 22, 64, and is thus not lost.

Irrespective of the circuit topology of the electronic components within the housing 4, 52, said electronic components can achieve an efficiency of maximum 94% from a load from 30%. This means that a connected load of 22 kW (22 kW*0.06) can produce a power loss of at least 1.32 kW. This can lead, for example, to a power loss of 4*1.32 kW=5.28 kW for a four-hour charging process. In the case of bidirectional exchange of electrical energy, such a power loss can also arise when the vehicle 32 is discharged. In an embodiment of the method according to the invention, however, this power loss is converted into heat and thus also waste heat for the consumer 26 in the building 28.

In one embodiment of the method, an energy exchange function, i.e. a charging function and/or discharging function, is realized which is used to control an exchange of electrical energy between the energy source 30 and the energy store 34. It is possible to control, and thus in an open-loop and/or a closed-loop manner, said energy exchange function according to the heat demand of the consumer 26 and/or a demand of the electrical energy store 34 of the vehicle 32. When the electrical energy store 34 of the vehicle 32 is connected to the electrical connection 16, 72 of the system 2, 50, a scheduled departure time for the vehicle 32 and a desired state of charge (SOC) can be input, for example by a user or driver of the vehicle 32, into the input unit 73, which can be arranged, for example, in the front wall of the housing 4, 52, and can be connected to a control unit, arranged for example in the housing 4, 52, for controlling an embodiment of the method. For example, the desired state of charge may be input as a percentage, such as a 100% SOC, for example. A day or calendar day, a month and a year (TT.MM.YYYY) and a time of day in hours and minutes (SS.MM) are entered for the departure time. It is possible to input such an input via an application or directly in a vehicle menu of the vehicle 32. For this purpose, it is possible for not only electrical energy to be transported via the electrical connection or line 38 between the energy source 30 and the energy store 34 but also for data to be exchangeable between the vehicle menu of the vehicle 32 and the control unit of the system. Furthermore, it is possible for the housing 4, 52 or the wall box, as the charging means, to have, in addition to the control unit, a communication interface or communication means to an energy management system of the building 28, wherein the control unit can communicate with the energy management system via the communication interface, for example via a so-called smart home server and/or LAN or WLAN data exchange. If the energy management system of the building 28 now registers and/or reports a heat demand of the consumer 26 arranged therein, such as when an area in the building has to be heated or hot water has to be generated, it is possible for the energy management system of the building 28 to start charging or a charging process of the electrical energy source 30 of the vehicle 32. For this purpose, the energy management system can communicate indirectly or directly via the communication interface in the housing 4, 52 with a control unit of the vehicle 32. Since the energy source 30 is already connected to the electrical connection 16, 72, the charging can be started at any time as required. The heat generated thereby due to power loss from the energy conversion is supplied to the consumer 26 in the building as a heat demand. Therefore, it is possible to also control a discharge of the electrical energy store 34 of the vehicle 32 via the energy management system of the building if, for example, there is surplus energy and an additional heat demand of the consumer. Such surplus energy may arise, for example, if the energy is generated photovoltaically or via a photovoltaic system. In order to realize the energy exchange function, the energy management system of the building 28 maintains and/or ensures the desired state of charge and the scheduled departure time as setpoint values.

Furthermore, it is possible for the driver or user of the vehicle 32 to initiate immediate charging or immediate discharging without entering a desired state of charge and departure time for the electrical energy store 34. In this case, the heat generated, owing to the power loss, is supplied to the consumer 26, for example a water heating system, even without an explicit heat demand of the consumer 26 and/or of the energy management system of the building 28, and is thus utilized.

The invention claimed is:

1. A system for exchanging electrical energy between an electrical energy source and an electrical energy store of a vehicle, wherein the system comprises:
a housing in which a power electronics unit, an electrical connection, and a cooling device are arranged,
wherein the housing is arranged against a wall of a building,
wherein the electrical energy store of the vehicle is electrically connectable to the power electronics unit via the electrical connection,
wherein the power electronics unit comprises at least one of an AC/DC converter and a DC/AC converter, and the power electronics unit facilitates a bidirectional exchange of electrical energy between the electrical energy source and the electrical energy store of the vehicle,
wherein the cooling device comprises a cooling medium which cools the power electronics unit,
wherein the cooling device is thermally coupled to a consumer of heat which is arranged in the building, and
wherein the power electronics unit is configured to charge and discharge the electrical energy store to meet a heat demand of the consumer of heat.

2. The system according to claim 1, wherein the electrical connection is a DC connection.

3. The system according to claim 1, wherein the power electronics unit rests against the cooling device.

4. The system according to claim 1, wherein the cooling device is indirectly coupled to the consumer of heat by way of a heat exchanger.

5. The system according to claim 1, wherein the cooling device is directly coupled to the consumer of heat such that the cooling medium is circulated through the consumer of heat.

6. A method for exchanging electrical energy between an electrical energy source and an electrical energy store of a vehicle, comprising:
bidirectionally exchanging electrical energy between the electrical energy source and the electrical energy store of the vehicle by way of a power electronics unit, and
collecting heat generated by the power electronics unit for use by a consumer of heat arranged in a building,
wherein the power electronics unit is arranged against a wall of a building in a housing with a cooling device and an electrical connection,
wherein the electrical energy store of the vehicle is electrically connectable to the power electronics unit via the electrical connection,
wherein the power electronics unit comprises at least one of an AC/DC converter and a DC/AC converter,
wherein the cooling device comprises a cooling medium which cools the power electronics unit,
wherein the cooling device is thermally coupled to the consumer of heat which is arranged in the building, and
wherein the power electronics unit is configured to charge and discharge the electrical energy store to meet a heat demand of the consumer of heat.

7. The method according to claim 6, wherein a controller commands the bidirectional exchange of electrical energy between the electrical energy source and the electrical energy store of the vehicle.

8. The method according to claim 6, wherein the cooling device is indirectly coupled to the consumer of heat by way of a heat exchanger.

9. The method according to claim 6, wherein the cooling device is directly coupled to the consumer of heat such that the cooling medium is circulated through the consumer of heat.

10. The system according to claim 1, wherein a controller commands the bidirectional exchange of electrical energy between the electrical energy source and the electrical energy store of the vehicle based on a desired state of charge and a schedule of a user of the vehicle.

11. The system according to claim 10, wherein the controller is communicatively coupled to the vehicle and the desired state of charge and the schedule are set by the user through an interface of the vehicle.

12. The method according to claim 7, wherein the controller commands the bidirectional exchange of electrical energy between the electrical energy source and the electrical energy store of the vehicle based on a desired state of charge and a schedule of a user of the vehicle.

13. The method according to claim 12, wherein the controller is communicatively coupled to the vehicle and the desired state of charge and the schedule are set by the user through an interface of the vehicle.

14. The system according to claim 1, wherein the cooling device is embedded in a rear wall of the housing, the electrical connection is mounted on a front wall of the housing, and the power electronics unit is mounted against the rear wall.

15. The system according to claim 14, wherein a gap pad is disposed between the power electronics unit and the rear wall.

16. The method according to claim 6, wherein the cooling device is embedded in a rear wall of the housing, the electrical connection is mounted on a front wall of the housing, and the power electronics unit is mounted against the rear wall.

17. The method according to claim 16, wherein a gap pad is disposed between the power electronics unit and the rear wall.

18. The system according to claim 1, wherein the consumer of heat is a sanitary hot water system of the building.

19. The method according to claim 6, wherein the consumer of heat is a sanitary hot water system of the building.

\* \* \* \* \*